J. W. BLOSSER.
PROCESS OF MAKING CIGARETTES.
APPLICATION FILED JULY 8, 1912.
1,066,579.
Patented July 8, 1913.
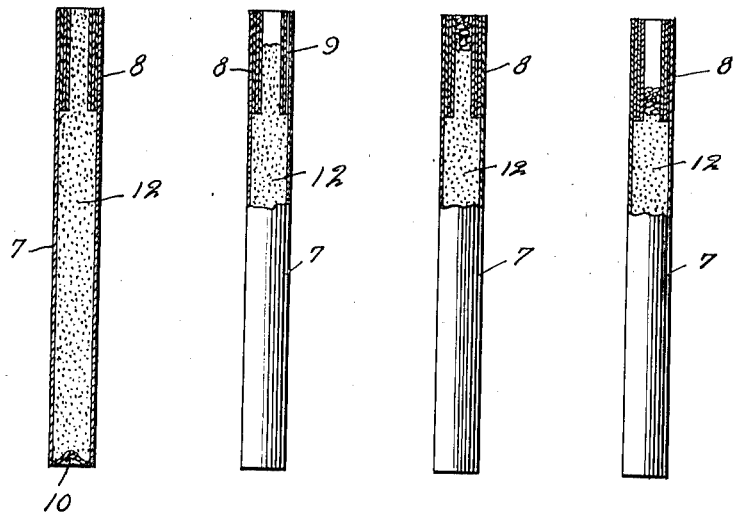
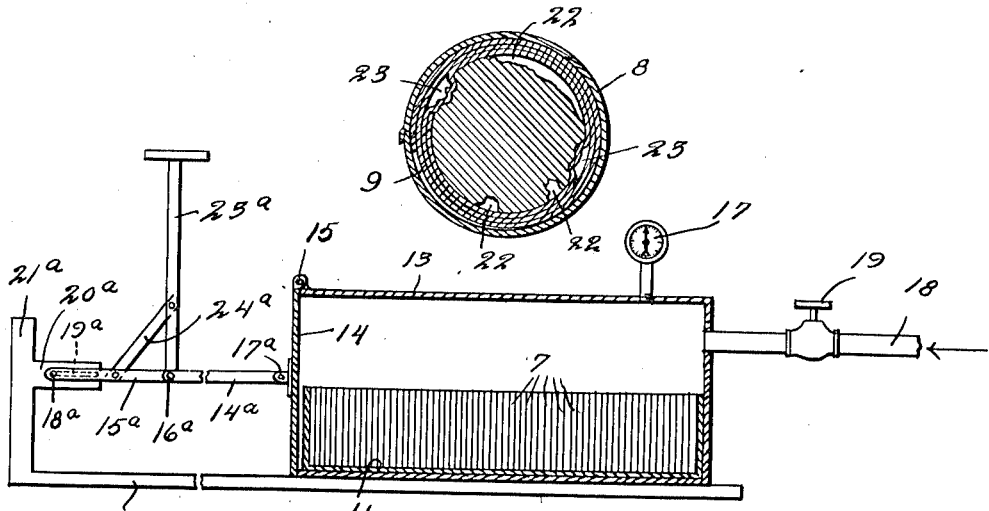
Witnesses
J. Milton Jester
Inventor
Joseph W. Blosser
By C. L. Parker
Attorney

UNITED STATES PATENT OFFICE.

JOSEPH W. BLOSSER, OF ATLANTA, GEORGIA.

PROCESS OF MAKING CIGARETTES.

1,066,579.  Specification of Letters Patent.  Patented July 8, 1913.

Application filed July 8, 1912. Serial No. 708,326.

*To all whom it may concern:*

Be it known that I, JOSEPH W. BLOSSER, a citizen of the United States, residing at Atlanta, in the county of Fulton and State of Georgia, have invented certain new and useful Improvements in Processes of Making Cigarettes, of which the following is a specification.

This invention relates to the manufacture of cigarettes which include tubes filled with a powdered or granular material, and has particular reference to an improved process of forming plugs or stoppers in the ends of the tubes to prevent the powdered or granular material being drawn into the user's mouth.

In Letters Patent No. 984,742, granted to me under date of February 21, 1911, I described and claimed a process of making cigarettes having a powdered or granular filling, which process may be briefly stated as follows: A plurality of cigarette paper tubes having tips or mouth-pieces are arranged in a bundle with the mouth-piece ends uppermost. The powdered or granular filling is introduced into the tubes by placing such filling in sieve and shaking the same over the tubes. After the tubes are filled with this material the support upon which they are placed is jarred to cause the powdered or granular material to settle. After this is done, a powdered or granular glutinous substance is fed into the tipped ends of the tubes by the employment of a sieve, as hereinabove stated. The support is again jarred to cause the glutinous particles to settle. After this the powdered or granular glutinous substance is heated or moistened and heated, as by the action of steam. The object in so treating the glutinous substance is to cause the particles thereof to melt and form a homogeneous mass, which adheres to the inner side or turn of the spirally or circularly wound paper forming the mouth-piece. When the mass of glutinous material cools it tends to contract and pull away from the wall of the mouth-piece at several points and also to draw in portions of the inner turn of the mouth-piece, thus forming openings in the plug to allow of the passage of the smoke.

Although the process as above outlined has been extensively practised with a considerable degree of success, there are certain disadvantages which have been encountered in connection with the same and which it is the purpose of the present invention to overcome. The principal difficulty which has been encountered lies in so treating the granules or particles forming each plug, as to soften or melt all of them to form a homogeneous mass, and yet not seal the mouth-piece against the free passage of smoke therethrough. I have found that by simply subjecting these plugs of powdered or granular glutinous material to the action of steam for a predetermined period, as for example two or three minutes, at atmospheric pressure, as is contemplated in Patent No. 984,742, many of the plugs will have nearly all of their particles or granules softened to form a solid homogeneous mass. There are usually however, many plugs wherein all of the particles or granules are not melted. This is believed to be due to the fact that when subjecting the plugs to the action of steam at atmospheric pressure, it constantly happens that the outer or uppermost particles forming the same melt first and thus form a protecting covering, which prevents the steam from melting the inner particles. In the cigarettes having plugs thus imperfectly formed, the particles which have not melted work their way into the filling of the cigarettes. Furthermore, the solid coherent upper portion of the glue is not infrequently so thin as to break and crumble if the cigarette is held firmly between the fingers or pressure otherwise applied thereto. Another difficulty which has been encountered is that as a result of the long treatment necessary to soften and agglomerate the glutinous material, such material is sometimes so thoroughly melted at its upper surface, as to seal the mouth-piece against the passage of smoke therethrough.

Now I have discovered a process of treating plugs formed of powdered or granulated glutinous material, to cause all of the particle in each of the plugs of a large number of cigarettes to soften and form a homogeneous solid mass.

In the practice of my improved process, a large number of the cigarettes having plug material consisting of granular glutinous material, are bound together or placed in a box or other receptacle with the mouth-pieces uppermost. The cigarettes are now introduced into a casing or chamber adapted to be closed and capable of withstanding considerable pressure. Superheated steam is now fed into the chamber preferably at a pressure of about twenty pounds to the square inch. The cigarettes are subjected to the action of the superheated steam for a very short time only, preferably about five seconds. The chamber is then opened and the cigarettes removed. It will be found that practically all of the particles in each plug have melted sufficiently to form a homogeneous coherent mass, without sealing or stopping up the mouth-piece. By subjecting the particles in the plug to steam under pressure, such steam being under pressure, quickly passes through the plug, compressing the air in the lower portion of the cigarette tube, thus coming immediately in contact with the inner particles and effecting its softening action uniformly throughout the mass of glutinous material. Furthermore, I have found in the practice of my improved process that larger openings for the passage of smoke, are produced in the plugs than resulted from the practice of my former process.

In the accompanying drawings forming a part of this specification and in which like numerals are employed to designate like parts throughout the same, Figure 1 is a longitudinal sectional view through a cigarette after the filling has been introduced therein, Fig. 2 is a side view of the same, partly in elevation and partly in longitudinal section, showing the position occupied by the filling after the first jarring operation, Fig. 3 is a similar view after the granules of glue or the like have been introduced therein, Fig. 4 is a similar view after the second jarring operation, Fig. 5 is an enlarged cross-section through the cooled filler retaining plug, and, Fig. 6 is a central longitudinal sectional view through apparatus which may be advantageously employed in subjecting the plugs to the action of steam under pressure.

In the drawings wherein, for the purpose of illustration, I have shown a preferred embodiment of my invention, the numeral 7 designates cigarette paper tubes which are provided at their upper ends with tips or mouth-pieces 8, each of which is formed of a coiled strip of paper providing thin annular spaces 9 therebetween, through which smoke may be drawn when portions of the turns are moved away from each other. The tubes 7 have their lower ends tucked in to close them, as shown at 10. A suitable number of the tubes 7 are placed in a box 11 in upright positions, with their tipped ends disposed uppermost. A powdered or granular medicinal or other filling 12 adapted for smoking is then introduced into the tubes by sifting it over the assembled group. The support (not shown) upon which the box 11 is placed is suitably jarred, causing the filling 12 to settle down into the tubes, leaving an empty space in the upper ends of the tips or mouth-pieces 9, as shown in Fig. 2. A small quantity of powdered or granular glutinous material, preferably glue, is now sifted over the tips 9 of the tubes 7 until they are again filled, as shown in Fig. 3. The excess of material is now brushed off and the tubes are again jarred to cause the particles of glue to settle, as shown in Fig. 4. The plugs formed of the powdered or granular glutinous material or glue are next subjected to the action of steam under pressure, this step of the process being advantageously practised in the apparatus shown in Fig. 6, wherein the numeral 13 designates a normally closed chamber, having an opening at one end provided with a steam tight closure or door 14. This door 14 has a hinged connection with the chamber or shell 13, as shown at 15. Means are provided to normally hold the door 14 closed and to allow the same to be suddenly opened by pressure within the shell 13, when desired. Such means comprises a link or toggle-joint structure, including links 14ª and 15ª, which are pivotally connected by a bolt 16ª. The link 14ª is pivoted to the swinging door 14, as shown at 17ª. The link 15ª carries a bolt 18ª, operating in an elongated slot 19ª formed upon a stationary head 20ª. The head 20ª is carried by an upstanding arm 21ª, formed upon a horizontal base 22ª, as shown. The bolt 16ª passes through the lower end of an upstanding lever 23ª, which is disposed at a right angle to link 15ª and rigidly connected therewith by a diagonal link 24ª. It is thus seen that when the links 14ª and 15ª are in their normal position to form a straight angle, they will hold the door 14 closed. By swinging lever 23ª to the left the pivot point 16ª will be elevated above the pivot points 17ª and 18ª, whereby the links 14ª and 15ª will be free to swing when moved by the opening of the door 14, by pressure within the same.

The chamber may be advantageously provided with a steam pressure gage 17. Steam under high pressure may be supplied to the chamber 13 through a steam supply pipe 18, provided with a cut-off valve 19.

The box 11 containing the cigarettes is placed within the chamber 13, after which the door 14 is closed and securely held in this position by the bolts 15. The valve 19 is now opened to allow steam under pressure to pass into the chamber 13. The supply of steam is maintained until a pressure of preferably twenty pounds to the square inch is obtained in the chamber, as indicated by the gage 17. This steam pressure is maintained for a very short time, the best results being obtained when the plugs are subjected to the action of the steam for from five to eight seconds. The valve 19 is then closed. The door 14 is opened and the box 11 containing the cigarettes withdrawn from the chamber 13. After this treatment, it will be found that all of the particles in the plugs have been melted to form a coherent homogeneous mass which adheres to the inner side of the tip or mouth-piece 9. These plugs are now allowed to cool and harden and in so doing they tend to contract and to break away from the inner turn of the mouth-piece at various points, forming passages 22. At other points the plug adheres to the inner turn of the mouth-piece and tends to draw the same inwardly with it, forming passages 23. If, however, steam under pressure is applied for the right number of seconds the plugs, even when softened, will not wholly melt and close the mouth-piece against the passage of smoke so that the user of the process is independent of the contracting above referred to.

I have found in actual commercial practice, by employing my improved process herein before described, that I am able to practically wholly overcome the disadvantages of my former process, producing in less time and with much less care and attention on the part of the operatives a very much higher percentage of perfect plugs. In fact, since the employment of my improved process I am able to produce a yield of practically one hundred per cent. of cigarettes having coherent plugs and mouth-pieces through which smoke can be freely drawn.

Having thus described my invention, I claim:—

1. The method of providing a cigarette with a filler-retaining plug, which consists in introducing into the cigarette tube divided glutinous material to be used in forming the retaining plug, subjecting such material to the action of steam under pressure exceeding atmospheric pressure, and allowing said material to cool.

2. The method of providing a cigarette with a filler-retaining plug, which consists in introducing into the cigarette tube particles of glue to form the plug, subjecting such particles to the action of steam under pressure exceeding atmospheric pressure for a short time, and allowing the mass to cool.

3. The herein described method of providing a cigarette with a filler-retaining plug, which consists in introducing into the cigarette tube small particles of glutinous material, placing the cigarette in a normally closed chamber, and introducing steam into the chamber at a pressure of approximately twenty pounds per square inch for a few seconds, removing the cigarette from the chamber and allowing said mass to cool and harden.

4. The herein described method of forming cigarettes, which consists in arranging a suitable number of cigarette tubes in an upright position to form a group of the same, introducing a suitable smoking material into the tubes, introducing particles of glutinous material into said tubes above the smoking material, placing the filled tubes within a normally closed chamber, introducing steam into the chamber at a pressure of substantially twenty pounds to the square inch for approximately five seconds, removing the cigarettes from the chamber and allowing the glutinous material to cool and harden.

In testimony whereof I affix my signature in presence of two witnesses.

JOSEPH W. BLOSSER.

Witnesses:
C. L. PARKER,
ARTHUR L. BRYANT.